United States Patent [19]

Lilakos

[11] Patent Number: 4,952,224
[45] Date of Patent: Aug. 28, 1990

[54] METHOD AND APPARATUS FOR CRYOGENIC CRYSTALLIZATION OF FATS

[75] Inventor: Louis Lilakos, Oakville, Canada

[73] Assignee: Canadian Oxygen Limited, Missisauga, Canada

[21] Appl. No.: 338,323

[22] Filed: Apr. 17, 1989

[51] Int. Cl.$^5$ ............................................. B01D 9/04
[52] U.S. Cl. ......................................... 62/534; 62/57; 62/123; 264/28
[58] Field of Search ................... 62/57, 533, 534, 123; 264/28

[56] References Cited

U.S. PATENT DOCUMENTS

| | | | |
|---|---|---|---|
| 1,724,731 | 8/1929 | Schonfeld | 62/533 |
| 2,886,603 | 5/1959 | Shelton | 62/534 |
| 3,027,320 | 3/1962 | Buchanan | 62/534 |
| 3,670,520 | 6/1972 | Bonteil | 62/57 |
| 3,738,121 | 6/1973 | Swindell | 62/57 |

Primary Examiner—Ronald C. Capossela
Attorney, Agent, or Firm—Carol A. Nemetz; Robert I. Pearlman

[57] ABSTRACT

A method and apparatus for converting liquid fats into solid particles for blending with dry feed ingredients comprises spraying atomized liquid fat into the upper portion of the mixing chamber while directing a plurality of fine jets of liquid nitrogen against the liquid fat spray so as to produce solid fat particles which fall into the dry ingredients at the bottom of the mixing chamber. A homogeneous mix free of fat lumps is thereby readily obtained, even at the higher percentages of fat required for some animal feed.

9 Claims, 3 Drawing Sheets

METHOD AND APPARATUS FOR CRYOGENIC CRYSTALLIZATION OF FATS

The invention relates to a method and apparatus for converting liquid fats, oils or tallows into microcrystalline powders useful in the compounding of dry animal feeds and in other applications in the food industry. In the following description and claims, the term "liquid fat" will be used generically to include liquid or molten fats, oils or tallows.

In order to induce upper growth and fattening of livestock, it is desirable to add fats to the animal feed. In the raising of veal, a 20% level of added fat is typically employed. For this purpose, it is common commercial practice in the feed industry to spray liquid fat directly into the blender in which dry feed ingredients are mixed. A variety of spray nozzles arranged in different configurations are employed to spray or spread the liquid fat over the greatest possible surface area in the mixing blender, with the aim of making a homogeneous mix through which the fat is uniformly dispersed.

Even at levels of added liquid fat of as low as 5%–10%, however, mixing problems can develop. Non-uniformity in the mixing of liquid fat can give rise to lumps containing higher concentrations of fats, which must be isolated from the rest of the batch for disposal or remixing; either corrective measure is wasteful and/or time consuming. Dry feed ingredients can only absorb a certain percentage by weight of added liquid fat before becoming "wet" (saturated), whereupon the texture of the mix changes from dry and powdery to wet and plastic. Saturation by fat during the mixing process is extremely undesirable, as it usually requires the entire batch of feed to be scrapped.

Accordingly, where the feed or food product formula calls for a mix including a high percentage of fat, near or above the point where the addition of sprayed liquid fat would cause saturation, the practice has been to add predried powdered fats in bag form to the mixture. Known such products are variously prepared by the cooling and flaking of liquid films of fat, or by spraying hot liquid fat into a tower against refrigerated or cooled air causing the fat to solidify into a powder. The purchase of fifty-pound bags of powdered fat is quite costly, however, and the mixing of powdered fats with feed is both labour intensive and time consuming, as the bagged powdered fat must be added manually into the blender.

The present invention is based on the discovery that the conversion of liquid fat to a crystallized or powdered form in situ, by spraying fat and a cryogenic liquid coolant such as liquid nitrogen or carbon dioxide together into the mixer, produces a homogeneous mix free of fat lumps, even at the higher fat percentages required for some animal feeds.

Crystallizing the fat in the blender itself has the substantial practical advantage of eliminating the need for costly heat dried pre-bagged powdered fats and absorbing agents. The consistent production of a dry batch of feed mix not only avoids waste, but reduces the labour and time which had previously been required for clean-up of mix sticking to the walls of the blender. Quality control is also improved over the liquid spray addition process, since a more uniform batch can be consistently achieved. Further, the direct introduction of cryogenically solidified liquid fat particles has the effect of lowering the overall temperature of the batch, thereby partially offsetting the heat generated by the friction of the blending process.

With a view to achieving the aforementioned advantages, the invention is in one aspect directed to a method of producing solid particles of fat for blending with dry ingredients in a mixing chamber. A fine, downwardly directed spray of atomized liquid fat is introduced into the upper portion of a conventional feed mixing chamber, while a plurality of fine jets of cryogenic liquid are directed against the downward spray of liquid fat droplets, so as to cause rapid conversion of the droplets to solid particles, which then fall into the dry ingredients at the bottom of the mixing chamber. Because of their relative inertness and safety, liquid nitrogen or carbon dioxide may be used as the chilling agents.

The invention is in another aspect an apparatus for producing solid particles of fat for blending with dry ingredients in a mixing chamber, comprising means disposed in the upper plenum of the mixing chamber operable to produce a downwardly directed spray of atomized liquid fat and means for producing a radially inwardly-directed spray of liquid nitrogen or carbon dioxide to surround and impinge against the downwardly directed spray of liquid fat droplets.

In drawings which illustrate embodiments of the invention:

Figure 3:
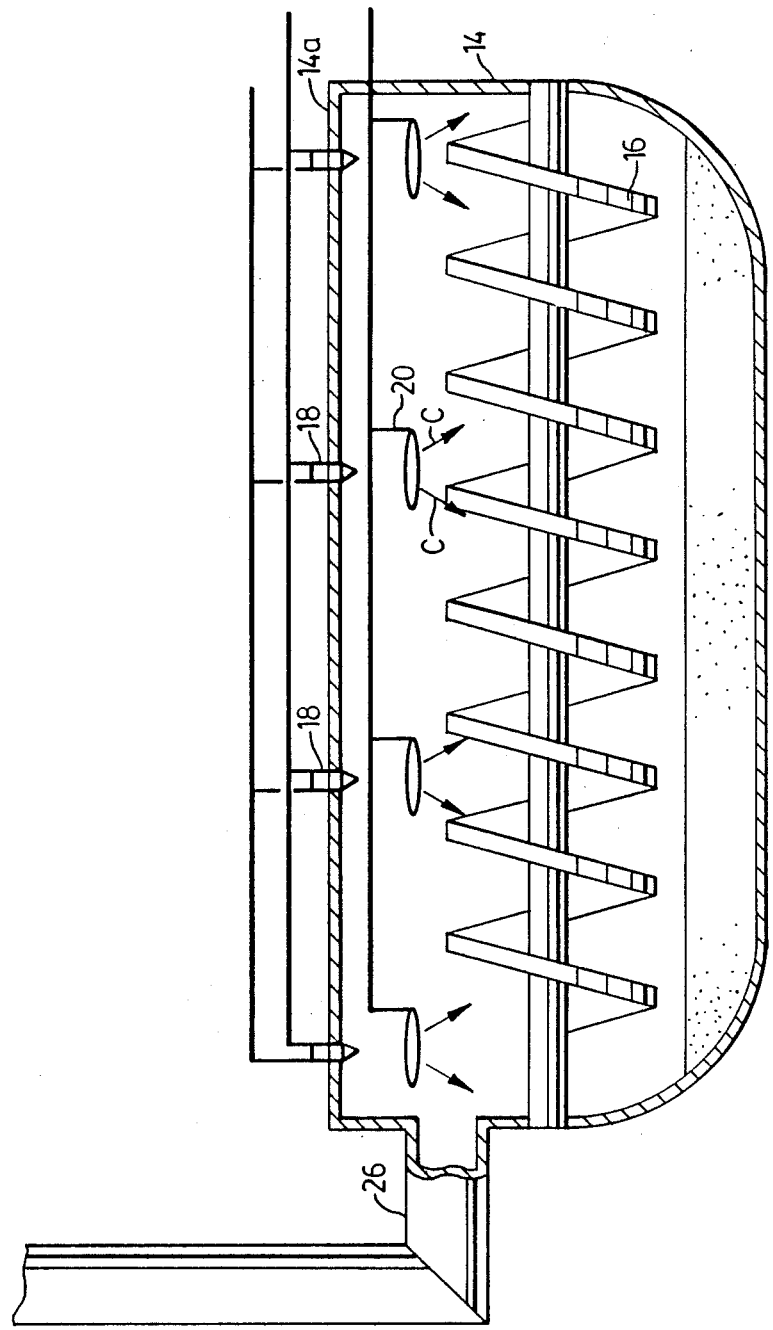

FIG. 3 schematically illustrates an alternative installation of apparatus according to the invention in a feed mixing blender.

Figure 1:
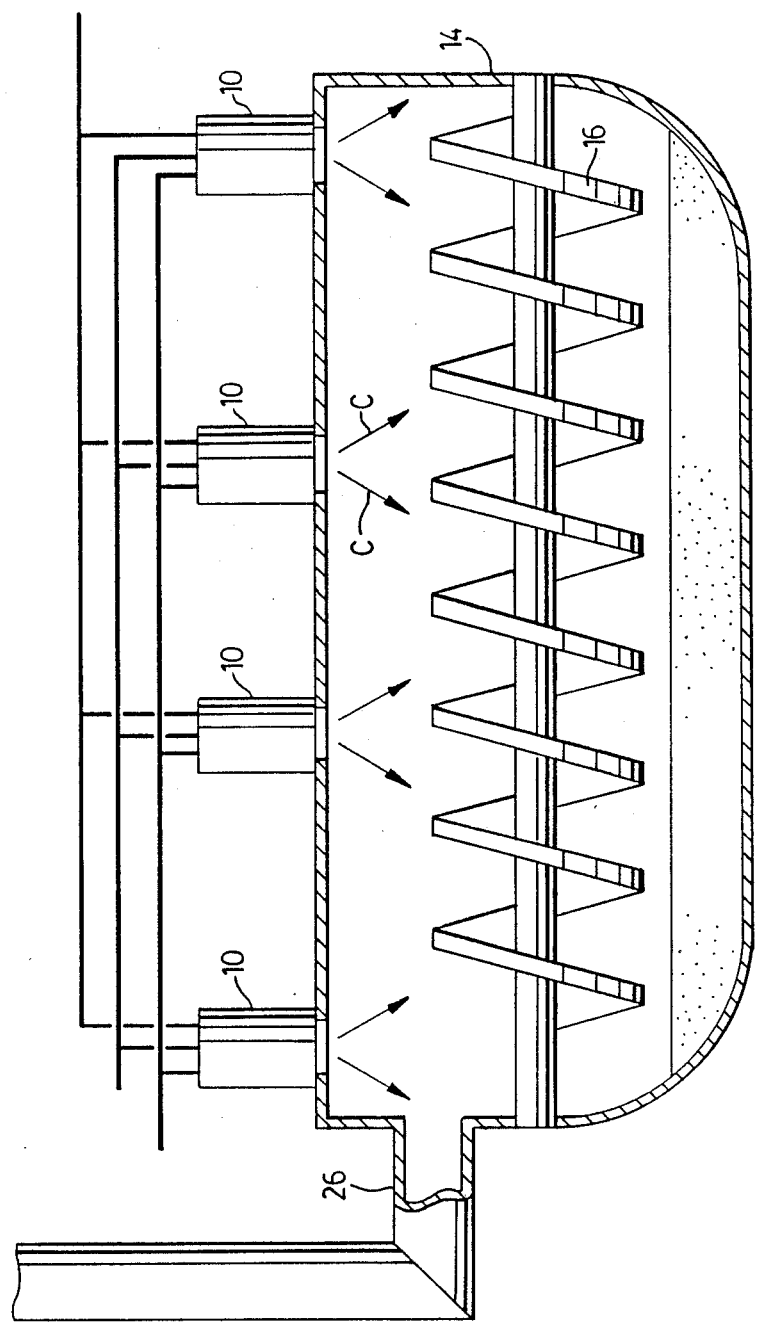
FIG. 1 is a schematic representation of a feed blender equipped with apparatus according to a preferred embodiment of the invention.
Figure 2:
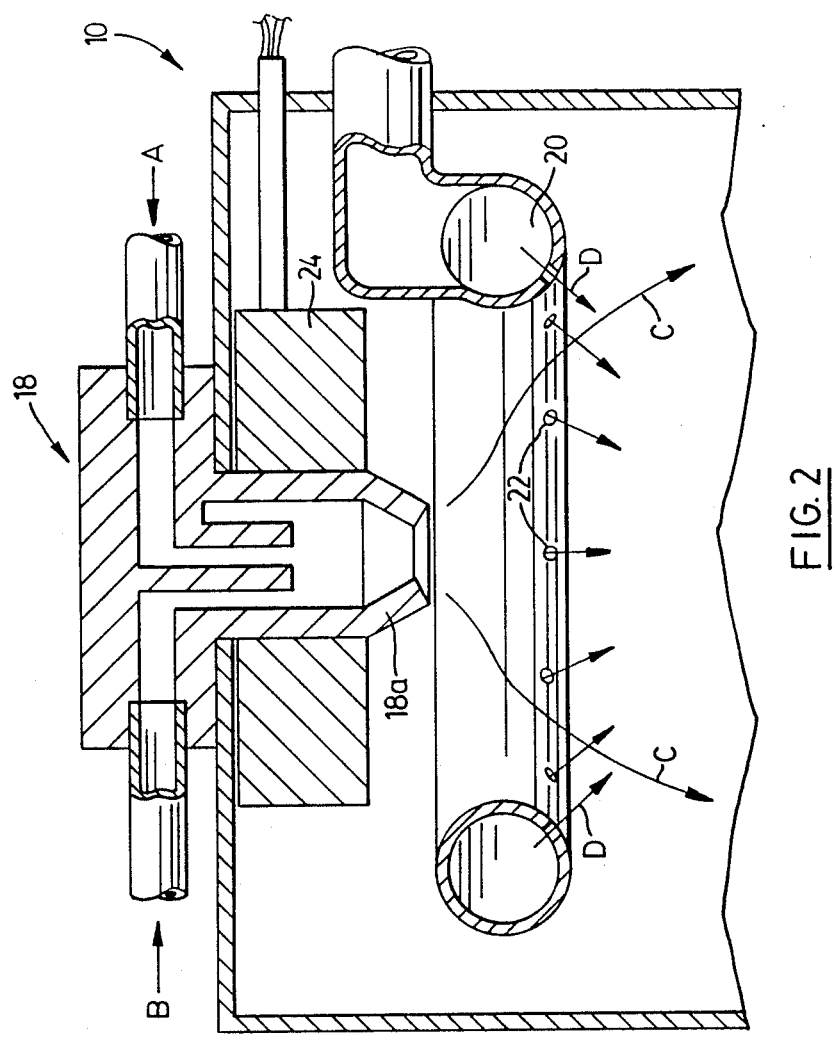
FIG. 2 is a vertical cross-sectional view of the atomizing nozzle, spray ring and cylindrical housing of a cryogenic crystallization apparatus according to the embodiment illustrated in FIG. 1.

With reference to FIGS. 1 and 2, one or a plurality of cryogenic crystallization units according to the invention are housed in cylindrical shrouds 10 which open downwardly into the top of a conventional feed mixing chamber 14 equipped with a power driven blending auger 16. Associated with each cylindrical housing is a top-mounted atomizing nozzle, indicated generally at 18 in FIG. 2, operable to break up liquid fat sprayed therethrough into very small particles or droplets. Known such atomizing nozzles include an inlet through which liquid fat may be introduced (arrow A) and a separate channel for the introduction of air under pressure (arrow B). To obtain very fine atomization of the liquid fat, the simultaneous introduction of liquid fat and pressurized air through a known nozzle structure taking advantage of the Venturi principle must be used. Commercially available Venturi nozzles found to be useful in applying the present invention include $\frac{1}{8}$J, $\frac{1}{4}$J, $\frac{1}{2}$J, and 1J sizes. However, if coarser fat particles are desired, nozzles using no air and liquid fat pressure alone may be employed.

The outer contour of the downwardly directed spray of liquid fat droplets issuing from the tip 18a of nozzle 18 is indicated by arrows C. The external sources of liquid fat under pressure and of pressurized air are not shown in the drawings, nor is the conventional valve means in the lines to control the fat and the air. A pair of Jamesbury ball valves are suitable for controlling the flows of liquid fat, air and nitrogen.

The atomized droplets of fat are sprayed with a cryogenic liquid introduced through a spray ring 20. The ring may be made of aluminum tubing, stainless steel or copper "K" of a diameter from ¼" to ¾". The diameter of the ring itself will typically be between 6 and 8 inches, although the chosen size will vary to suit the mixing system designed for. The inner surface of the toroidal spray ring is drilled around its circumference with an evenly spaced plurality of small holes 22, the number and sizes of which will be chosen according to the flow rates of fat being sprayed.

It is important that holes 22 be drilled equidistant from each other around the circumference and have bores biased at an inward angle along the bottom of the spray ring, so as to produce an inverted conical spray pattern (arrows D) which converges downwardly and impinges on the stream C of atomized liquid fat droplets.

The cylindrical housing or shroud 10 functions to provide a surface on which to mount spray ring 20 and nozzle 18, but also to concentrate and contain the cold nitrogen or carbon dioxide in the vicinity of the atomized fat. Typically, the dimensions of the shroud will be of the order of 16 inches diameter and 1 to 5 feet tall, varying according to the specific application.

Optionally, two heating elements may be included in the apparatus. The first heater, 24, is an element which wraps around nozzle 18 to prevent the fat injected therethrough from solidifying within the nozzle. The amount of heat may be regulated and controlled by a voltage controller (not shown).

The second heater consists of a standard heat wrap surrounding the shroud (not shown) to prevent any solidified fat from building up on the sides of the shroud. At the end of a day's operation, this second heater surrounding the shroud may be turned on for a few minutes to melt any solidified fat which has incidentally accumulated on the interior surface of the shroud.

Although the presence of a shroud (housing) for the nozzle/spray ring combination is desirable for the reasons noted above, the method of the invention may be carried out by installing an array of nozzles and spray rings within a mixing chamber 14 directly under the top wall 14*a* thereof, where space limitations so require, as illustrated in FIG. 3. If not already equipped with a vent or exhaust, a blender making use of the method and apparatus of the invention should be provided with an exhaust port 26 to vent the nitrogen and air introduced into the mixing chamber.

In operation, blender 14 is first charged with the basic dry ingredients for the animal feed or other product which is to be enriched with fat. Liquid fat is then pumped under pressure from a heated storage vessel through a pipe to the blender and is sprayed into the mix through a single or a series of atomizing spray nozzles 18. As noted above, the purpose of the spray nozzles is to atomize the fat into the smallest possible particles or droplets.

As the fat is sprayed into the plenum of the blender it is shocked with a spray of liquid nitrogen or carbon dioxide introduced through spray rings 20. It may also be advantageous in some cases to commence the nitrogen spraying cycle a few seconds before the fat spray cycle is commenced, to cool down the blender. During spraying of the cryogenic coolant, the heaters surrounding nozzles 18 are operated to prevent fat from freezing within and occluding the nozzles 18.

Crystals of fat similar to snow flakes fall from shrouds 10 into the blender and are uniformly distributed and mixed into the dry ingredients. The spraying of fat is stopped when the desired amount of material has been added and the nitrogen or carbon dioxide flow is stopped simultaneously, along with the heater on the nozzle, marking the conclusion of the mixing cycle. The batch is then emptied from the mixer, which is then charged with a new batch for repetition of the cycle.

It will be appreciated that the entire mixing process described above may be carried out automatically under the control of a microprocessor operable to time all stages of the mixing cycle and to actuate valve means to control the sprays of liquid fat, air and cryogenic coolant.

EXAMPLE 1

In a system for the production of animal feed, a fat mixture of palm oil and beef tallow was crystallized using liquid nitrogen inside a blender. The fat mixture, having a melting point around 95° F., was heated and stored in the heated vessel at 135° F. The fat was pumped through twelve ¼J nozzles at approximately 40 psig pressure. The nozzles were located on the top inner surface of the mixer and arranged in three equidistant rows of four nozzles. Air was provided at 50 psig by compressor. Nitrogen coolant was stored in an 11,000 gallon liquid nitrogen storage vessel and conveyed through a 1" diameter vacuum jacketed pipeline to a series of spray rings located directly below each nozzle.

At the start of the mixing cycle, 1,600 pounds of dry ingredients, chiefly whey powder, were dumped into the mixture. Fat, air, and nitrogen were sprayed simultaneously through the nozzles for a period of 2.5 minutes, over the course of which approximately 400 lbs. of fat in total was sprayed. The percentage of fat in the final mix is determined by the selected amount of time that the fat, air and nitrogen are sprayed at a given pressure.

The mixture was then emptied and the batch of product was bagged. Samples of the mixture of crystallized fat and whey powder resembled a fine flour. Fineness of the mix can be enhanced by increasing the amount of nitrogen and/or increasing the air pressure.

EXAMPLE 2

In the preparation of an enriched bakery product, vegetable oil was crystallized outside the blender and subsequently added to flour.

Vegetable oil in the form of solid 20 lb. blocks (melting point approximately 75° F.) was placed in a heated vat at approximately 110° F. The melted oil was then pumped out of the vat and through a nozzle/spray ring/shroud arrangement as described in connection with FIGS. 1 and 2. The fat was not sprayed into a blender, however, but directly into a drum located beneath the shroud, for approximately 10 minutes. About 40 lbs. of crystallized oil was thereby collected and dumped into a mixer containing a desired proportion of flour. The entirety was mixed and the product batch was bagged. Sampling of the mixture showed the powder to be dry and free of lumps.

Those skilled in the art will recognize that the principles of the present invention will afford a number of applications, which have only been exemplified herein. Accordingly, the scope of the invention is defined by reference to the appended claims.

I claim:

1. A method of producing solid particles of fat for blending with dry ingredients in a mixing chamber, comprising introducing a fine, downwardly directed spray of atomized liquid fat into the upper portion of the mixing chamber while directing a plurality of fine jets of cryogenic liquid against the downward spray of liquid fat droplets so as to cause rapid conversion thereof to solid particles which fall into the dry ingredients at the bottom of the mixing chamber.

2. A method according to claim 1, wherein said cryogenic liquid is nitrogen.

3. A method according to claim 1, wherein said cryogenic liquid is carbon dioxide.

4. A method according to claim 1, wherein said fine jets of cryogenic liquid are regularly dispersed in circular symmetry about the spray of atomized liquid fat and directed obliquely inwardly against the liquid fat droplets.

5. Apparatus for producing solid particles of fat for blending with dry ingredients in a mixing chamber, comprising:
   (a) means disposed in the upper plenum of said mixing chamber operable to produce a downwardly directed spray of atomized liquid fat; and
   (b) means for producing a radially inwardly-directed spray of liquid nitrogen or carbon dioxide to surround and impinge against the downwardly directed spray of liquid fat droplets.

6. Apparatus according to claim 5, wherein said means operable to produce a spray of liquid fat comprises an atomizing nozzle in communication with an external source of liquid fat under pressure, and first valve means for controlling the rate of spraying of liquid fat through said atomizing nozzle.

7. Apparatus for producing solid particles of fat for blending with dry ingredients in a mixing chamber, comprising:
   (a) means disposed in the upper plenum of said mixing chamber operable to produce a downwardly directed spray of atomized liquid fat comprising an atomizing nozzle in communication with an external source of liquid fat under pressure, and the first valve means for controlling the rate of spraying of liquid fat through said atomizing nozzle; and
   (b) means for producing a radially inwardly-directed spray of liquid nitrogen or carbon dioxide to surround and impinge against the downwardly directed spray of liquid fat droplets, wherein the radially inwardly-directed spray of liquid nitrogen or carbon dioxide comprises:
      (i) a tubular spray ring surrounding the downward spray from said nozzle and presenting along the bottom thereof a plurality of regularly spaced spray holes, said holes being angled inwardly to direct liquid nitrogen or carbon dioxide introduced under pressure into said spray ring in a conical spray pattern converging on the stream of atomized liquid fat droplets;
      (ii) an external source of pressurized liquid nitrogen or carbon dioxide; and
      (iii) second valve means interposed between said source of liquid nitrogen or carbon dioxide and said spray ring, operable to control the spray of liquid nitrogen or carbon dioxide through said spray ring.

8. Apparatus according to claim 7, wherein said atomizer nozzle and said tubular spray ring are enclosed within and disposed at the top of a cylindrical housing opening downwardly into the top of said mixing chamber.

9. Apparatus for blending liquid fat with dry animal feed to produce a free-flowing mix, comprising:
   (a) a mixing chamber equipped with means for stirring feed mix and added particles of fat together;
   (b) a plurality of cylindrical housings distributed along the top of said chamber, each having a bottom opening communicating with the interior of said chamber;
   (c) an atomizing nozzle disposed within each of said cylindrical housings in the upper portion thereof, adapted to direct a downwardly directed spray of atomized liquid fat particles into the top of its cylindrical housing when operably connected to a controlled external source of liquid fat and air under pressure; and
   (d) a tubular spray ring mounted within each of said cylindrical housings and configured to surround the donward spray of liquid fat droplets from the atomizing nozzle disposed therein with an inverted spray pattern of cryogenic liquid converging on the downward spray of liquid fat droplets from said atomizing nozzle, when said spray ring is operably connected with a controlled external source of pressurized cryogenic liquid.

* * * * *